United States Patent [19]
Lorenzen et al.

[11] 3,889,617
[45] June 17, 1975

[54] APPARATUS FOR FORMING TUBULAR BODIES HAVING LONGITUDINAL SIDE SEAMS

[75] Inventors: Uwe J. Lorenzen; Harald Martens, both of Wedel, Germany

[73] Assignee: Schmalbach-Lubeca GmbH, Braunschweig, Germany

[22] Filed: Mar. 18, 1974

[21] Appl. No.: 452,046

[30] Foreign Application Priority Data
Mar. 23, 1973 Germany............................ 2314553

[52] U.S. Cl................ 113/8; 113/1 G; 113/116 W; 228/17
[51] Int. Cl............................................. B21d 51/26
[58] Field of Search ........ 113/8, 11, 7, 116 W, 1 G; 228/17

[56] References Cited
UNITED STATES PATENTS
2,773,465  12/1956  Gedde.................................. 113/8
3,552,629  1/1971  Armbruster et al.................. 113/8

*Primary Examiner*—Milton S. Mehr
*Attorney, Agent, or Firm*—Diller, Brown, Ramik & Wight

[57] ABSTRACT

This disclosure relates to an apparatus for forming from a flat blank a tubular body having a longitudinal side seam. The flat blank is first shaped into the form of an unseamed tubular body, after which the unseamed tubular body is transferred to a transfer mechanism wherein edges of the tubular body to be seamed are moved into spaced relation and thereafter, the expanded unseamed tubular member is moved into position relative to a guide rail whereat the unseamed tubular body is released and the edges thereof are freed to spring back together with the edges engaging the guide rail and positioning the unseamed tubular body with respect thereto. The unseamed tubular body is then moved along the guide rails through a suitable side seam forming mechanism, such as a welding mechanism.

12 Claims, 6 Drawing Figures

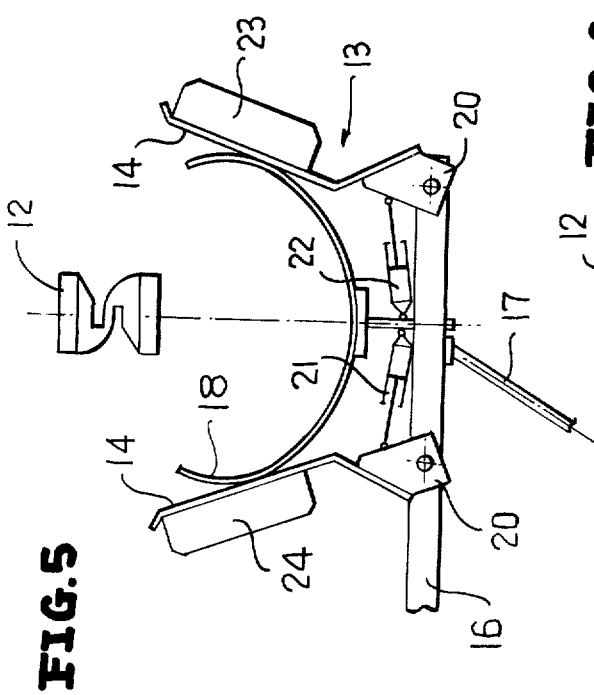
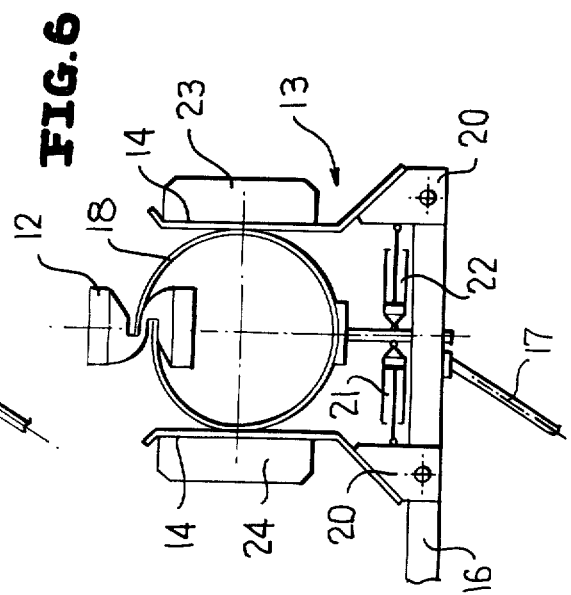
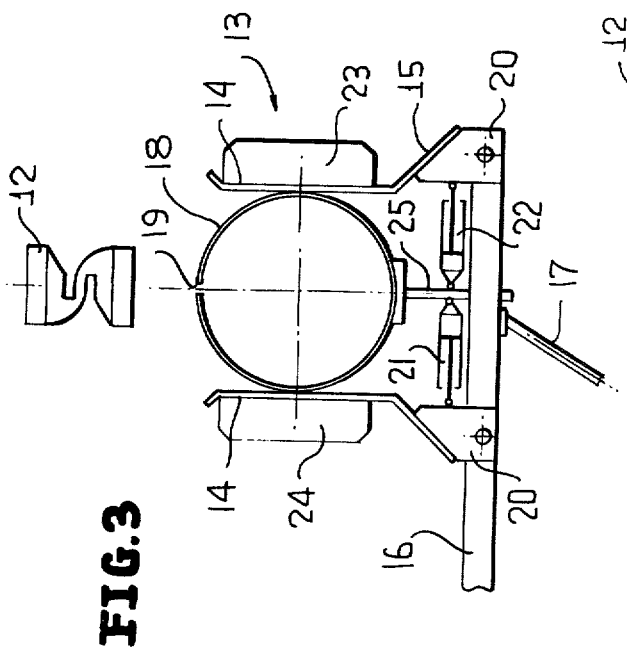
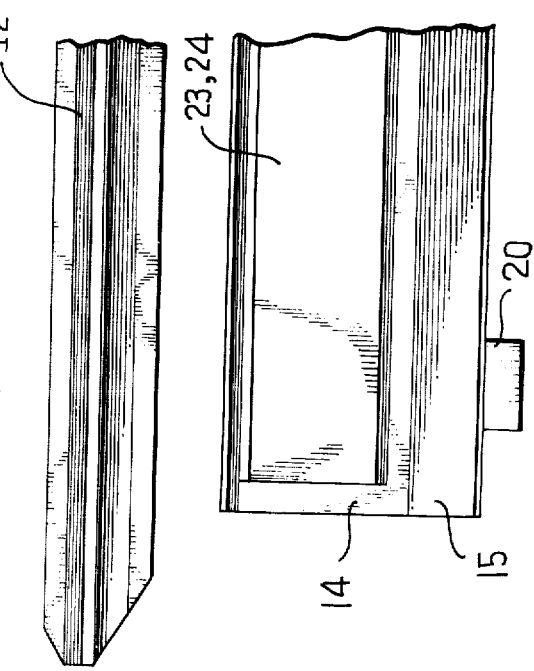

APPARATUS FOR FORMING TUBULAR BODIES HAVING LONGITUDINAL SIDE SEAMS

This invention relates to new and useful improvements in the manufacture of tubular bodies having longitudinal side seams, and more particularly to the formation of containers.

It is customary to form containers in a manner wherein the longitudinal side seam is formed by interlocking flanges and thereafter to complete the side seam by the application of solder.

It is also well known to form tubular bodies with longitudinal side seams wherein the side seams are formed by bonding or welding. However, when the edge portions of the tubular bodies which are to be joined are not interlocked with one another, it is difficult to maintain the necessary overlapped alignment of the edges of the unseamed tubular bodies during the formation of the bonded or welded side seam. In the past the tubular bodies have been restricted to cylindrical tubular bodies and have been formed about horns having associated therewith external guide means for holding the tubular body with the edges thereof in the proper overlapped relationship for welding or bonding. Inasmuch as the tubular bodies are normally provided with both an internal and external coating in the blank form, such supporting of the tubular bodies frequently results in damage to the tubular body coating.

In accordance with this invention, it is proposed to form an unseamed tubular body with the edges thereof in overlapping relation, and thereafter to expand the tubular body so that the edges thereof are widely spaced. With the edges of the tubular body so spaced, it is positioned on a guide rail and released with the tubular body recovering and the edges thereof gripping the guide rail so as to maintain the proper relationship of the edges for the formation of the necessary side seam.

In order to minimize or eliminate entirely any damage to the coating on the tubular body, the means for expanding the tubular body includes a pair of jaws having means for attracting the tubular body relative thereto without a positive gripping of the tubular body. Such means are preferably magnetic means, but could be pneumatic suction means.

A further feature of this invention is that the expensive horn and guide structure, as well as the support for the horn may be eliminated. Further, it is not necessary that the unseamed tubular bodies be formed in alignment with the side seam forming mechanism.

It is known to provide an electric welding machine which includes a welding arm having a roller electrode thereon and which has associated therewith another roller electrode. It is also known to form an unseamed tubular member from a flat blank and to place the same on the welding arm. The tubular member then has the edges thereof which are to be joined in a longitudinal seam aligned with the roller electrode and the same is advanced between the roller electrodes to form a welded seam.

The feeding of the unseamed tubular members to the welder causes considerable difficulties since it will first be necessary because of the required support of the lower welding arm that the unseamed tubular member will have to be first pushed over the freely projecting end of the lower welding arm and then welding of the side seam is effected during return movement. This, obviously, is time consuming and is undesirable. Further, the normal way of delivering the tubular bodies to the welder is by hand.

In view of the foregoing, it is the principal feature of this invention to find a way in which a flow of the unseamed tubular bodies from the forming machine to the welding machine may be accomplished without a manual operation, without a reversal of movement of the tubular body along the welding arm, and without expensive constructional arrangements.

A first feature of the invention is to provide the forming machine with an aligned extension of the T-rail thereof which receives the formed tubular body with the T-rail having associated therewith an expanding and gripping device which receives a formed unseamed tubular body from the T-rail. The expanding and gripping device is disposed below the welding arm of the welder and is automatically vertically movable so as to position an unseamed tubular body with respect to a Z-rail provided on the welding arm.

With this arrangement, a delivery of the formed tubular body from the forming machine takes place by the transfer of the formed body from the T-rail into the expanding and gripping device which transfers the formed body to the welding arm of the welder.

After the tubular body is positioned on the welding arm, it is engaged by feed means of the welding machine, and moved between the welding rolls. The movement of the tubular body from the blank stage to the finished tubular body is a generally U-shaped movement which provides for a very compact arrangement of the forming machine, delivery mechanism and welding machine.

It is to be understood that with the delivery device there may be a continuous flow of tubular bodies from the blank stage through the forming machine, into the delivery device and then along the welding machine. Further, this can be accomplished with a very small construction expenditure by merely interposing the expansion and gripping arrangement as well as the associated drives therefor into position relative to the discharge of the forming machine.

A commercially feasible simple embodiment of the invention will result whenever the expanding and gripping device has swivelling expanding jaws equipped with magnets and when the jaws are arranged on a lifting arm or frame.

As a result of equipping the expanding jaws with electromagnets, the tubular body can be extended and compressed with a simple control by suitable movement of the expanding jaws so that it can be transformed to the expanded position and in this way can be moved above the welding arm during the transfer thereof to the lower welding arm of the welding machine before it is suspended from the Z-rail located on the welding arm, and by a closing movement of the expanding jaws the unseamed edges of the tubular body may be hooked into the Z-rail and retained therein by its own elastic force even after releasing thereof by the expanding jaws. When engaged on the Z-rail, the tubular body may be moved by the conventional feed arrangement of the welder through the welding zone.

According to a preferred embodiment of the invention, there is provided between the expanding jaws a support member or rail which serves simultaneously for the quidance of the formed tubular body during the insertion thereof between the expanding jaws.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is an enlarged fragmentary end elevational view showing the delivery device during transfer of a tubular body to the Z-rail of the welding machine.

FIG. 4 is a partial side elevational view of the arrangement of FIG. 3.

FIG. 5 is a view similar to FIG. 3 with the gripping and expanding mechanism of the delivery device having been operated to open the tubular body for engagement over the Z-bar.

FIG. 6 is a further view similar to FIG. 3 and shows the tubular body as it is engaged with the Z-bar prior to release from the delivery device.

Figure 1:
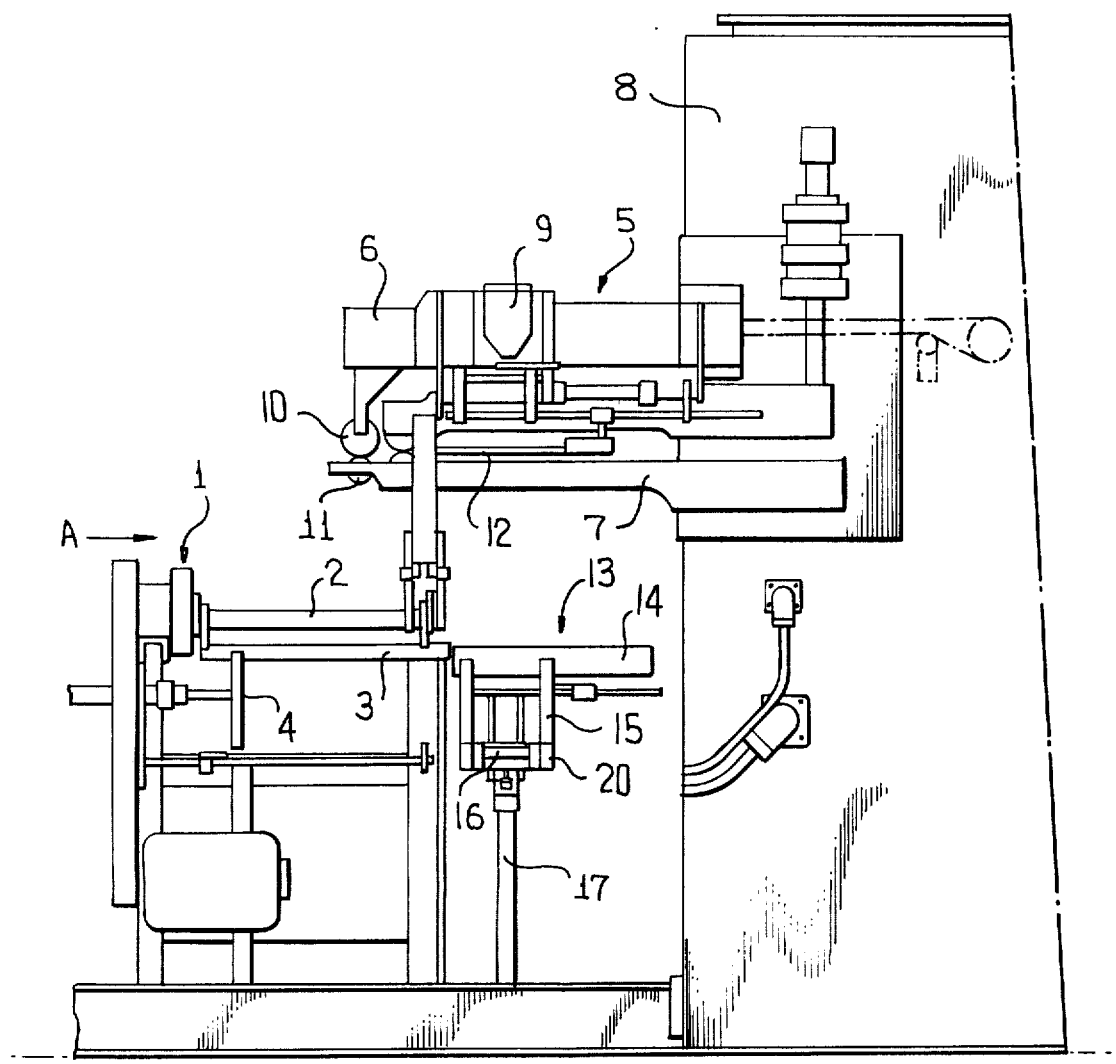
FIG. 1 is a side elevational view of an apparatus including a forming machine, a delivery device, and a welding machine with the delivery device being illustrated in position for receiving a newly formed tubular body.
Figure 2:
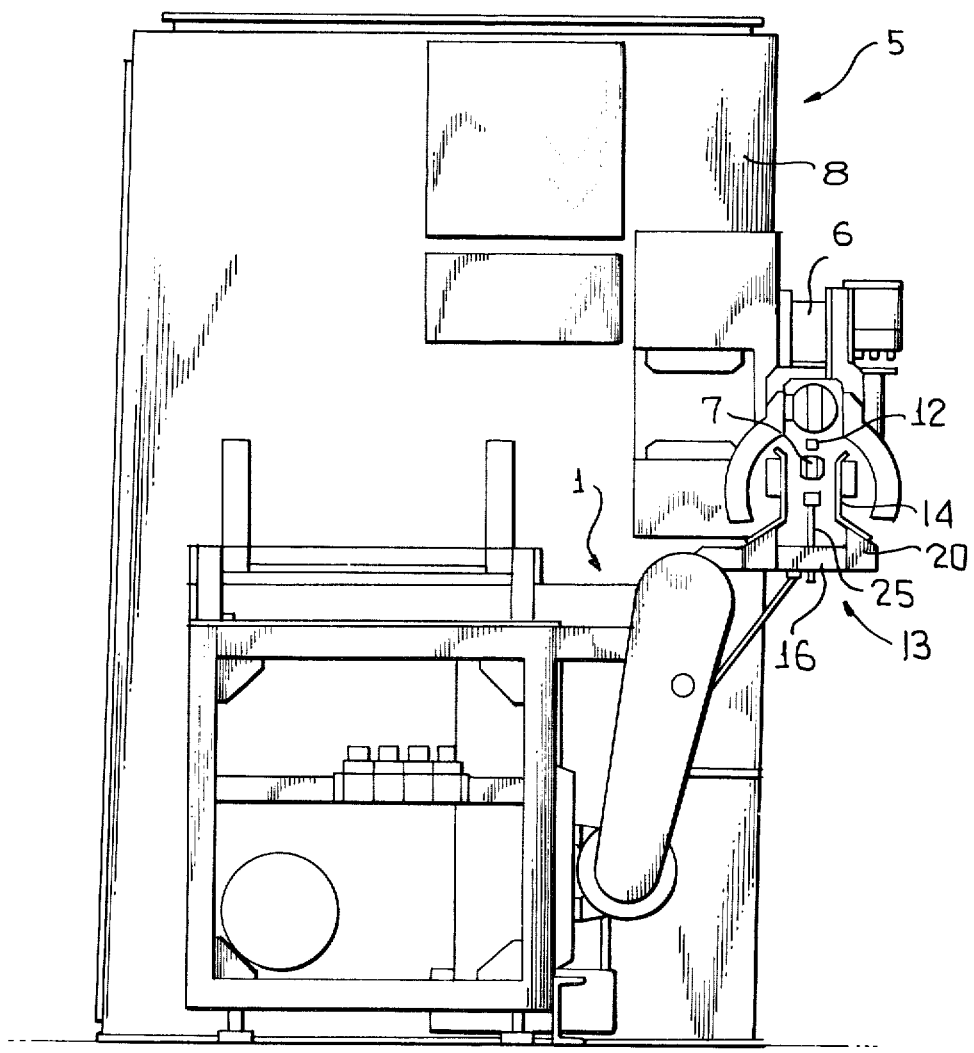
FIG. 2 is an end elevational view of the apparatus of FIG. 1 as viewed in the direction of the arrow A of FIG. 1, but with the delivery device in position delivering a tubular member to the welding machine.

Referring now to the drawings in detail, it will be seen that there is illustrated in FIGS. 1 and 2 a forming machine for forming tubular bodies from flat blanks, the forming machine being of a conventional type and generally identified by the numeral 1. The forming machine 1 is particularly constructed to form cylindrical tubular bodies, but the invention is not so limited. The forming machine 1 includes a pair of cooperating forming rolls 2 between which a blank is fed and is automatically shaped to a tubular configuration.

Immediately in front of the forming rolls 2, but offset slightly therefrom is a T-rail 3 about which the tubular bodies are formed and from which the tubular bodies are suspended. A pushing device 4 cooperates with the T-rail 3 and in timed relation with the operation of the forming machine 1, pushes tubular bodies along the rail to the right in FIG. 1.

As is also clearly illustrated in FIGS. 1 and 2, the forming machine 1 is positioned adjacent a welding machine generally identified by the numeral 5. The welding machine 5 has an upper welding arm 6 and a lower welding arm 7, both of which are in the form of freely projecting arms and are mounted at one of their ends in a rigid frame 8. A delivery device 9 is mounted on the upper rail 6 for moving tubular bodies through the welding machine in a welding operation. The upper arm 6 is provided with an upper roller electrode 10 while the lower arm 7 is provided with a lower roller electrode 11 arranged in cooperating relation with respect to the upper roller electrode 10. The lower welding arm 7 is also provided with a Z-rail 12, the configuration of which is best illustrated in FIGS. 3, 5 and 6.

As is best shown in FIG. 1, there is provided a delivery device or transfer device 13 which is positioned below the welding arms 6 and 7 and in alignment with an extension of the T-rail 3 of the forming machine 1.

With particular reference of FIG. 3, it will be seen that the transfer device 13 has expanding or spreading jaws 14 which include lower mounting portions 15 which are articulated relative to a lifting frame 16 which is connected with a lifting drive member 17.

Referring once again to FIG. 1, it will be seen that the transfer device 13, in its lower position, is aligned with the T-rail 3 and is ready to receive a formed tubular body formed by the forming machine 1. A formed tubular body is pushed off of the T-rail 3 by the pushing device 4 into the transfer device 13.

Referring now to FIG. 2, it will be seen that the lifting device 17 has elevated the transfer device 13 so that it is associated with the lower arm 7 of the welding machine and the expanding jaws 14 are disposed on opposite sides of the lower arm 7. When the transfer device 13 is in this position, a tubular body carried thereby would encircle the lower welding arm 7 and would be engaged with the Z-rail 12.

In FIGS. 3 – 6, the various stages of the transfer of a tubular body from the forming machine 1 to the welding machine 5 are illustrated. With reference to FIG. 3, the transfer device 13 is in a position immediately below the Z-rail 12, the lower welding arm 7 having been omitted for purposes of clarity. A formed tubular body 18 is positioned within the transfer device 13, but has not been expanded for engagement over the lower welding arm 7 and interlocking with the Z-rail 12. It is to be understood, however, that the tubular body 18 has been pushed by the pushing device 4 from the T-rail of the forming machine between the expanding jaws 14 and that there has been a lifting of the transfer device 13 by the lifting device 17.

It is to be noted that the tubular body 18 is held between the expanding jaws 14 in such a way that the unseamed longitudinal edges thereof are separated by a gap 19 which lies in the middle longitudinal plane between the expanding jaws 14. The expanding jaws 14 and the mounting portion 15 thereof are formed in one piece in the simplified illustration thereof of FIGS. 3 – 6 with the mounting portions 15 being connected with hinge blocks 20 which are pivotally mounted on the lifting frame 16. In order to carry out the expanding movement of the jaws 14, hydraulic or pneumatic actuating members 21, 22 are used, the pistons of which being attached to the hinge blocks 20 while the cylinders thereof are connected to a centrally located supporting rail 25 carried by the lifting frame and forming a seat for the tubular body 18. It is to be understood that the supporting rail 25 can be vertically adjusted in manners not shown to variable levels depending upon the diameters of the tubular bodies 18 to be transferred.

At this time it is pointed out that a lever system or other actuating mechanism or systems for the jaws 14 can be provided instead of the hydraulic and pneumatic actuating members 21, 22. These other systems or arrangements can be actuated from a central control in the same manner as are the hydraulic or pneumatic actuating members in order to effect movement of the expanding jaws 14 through the various required positions.

The expanding jaws 14 are equipped with electromagnets 23, 24 with it being intended that the electromagnets 23, 24 be controlled as to their energization also from a central control device.

Whenever the expanding jaws 14 are moved apart, as shown in FIG. 5, and the electromagnets 23, 24 are energized, the attraction of the tubular body to the electromagnets will result in the tubular body being spread. When the tubular body is in the spread position of FIG.

5 and the transfer mechanism 13 is moved vertically, the lower welding arm 7 can be readily received within the tubular body and the free edges of the tubular body may be brought into engagement with the longitudinal recesses in the Z-rail 12. This latter relationship is clearly illustrated in FIG. 6.

It is to be understood that after the tubular body 18 has been engaged with the Z-rail 12 in the manner illustrated in FIG. 6, the transfer device 13 may then be retracted after the electromagnets 23, 24 are de-energized. The tubular body 18 is now ready to be moved by the feed mechanism 9 between the roller electrodes 10, 11 for effecting the welding of the overlapping edge portions of the tubular body 18. It is to be understood that the overlap of the overlapping edges is controlled by the Z-rail 12 and that the overlapping of the edges of the tubular body within the Z-bar 12 is effected by the inherent spring action of the tubular body 18.

It is to be understood that while the transfer mechanism 13 is transferring a tubular body 18 from the forming machine to the welding machine, the forming machine can be forming a subsequent tubular body whereby when the transfer mechanism 13 returns to its starting position of FIG. 1, a next tubular body will be ready to be pushed into the transfer device by the pusher 4. At the same time, while the transfer device 13 is moving back to its original position and having another tubular body 18 pushed thereinto, the welding machine 5 may be actuated so as to weld the tubular body previously engaged with the Z-rail thereof. It will be readily apparent that a simple suitable central control device may be provided for effecting the actuation of the forming machine, the transfer device and the welding machine in sequence so that the operation thereof may be automatically effected and thus requires no operator assistance.

It is to be understood that in lieu of the welding machine 5, the seam forming machine may be a machine which bonds together the longitudinal edges of the tubular bodies by means of a solder, adhesive or like bonding means.

Although only a preferred embodiment of the transfer device and its association with a body forming machine and a seam forming machine has been illustrated and described herein, it is to be understood that minor variations may be made in the apparatus without departing from the spirit and scope of the invention, as defined by the appended claims.

We claim:

1. In an apparatus for handling unseamed tubular bodies wherein the tubular bodies are supplied in unseamed form and the apparatus includes a guide rail having grooves therein for receiving unseamed edges of the tubular bodies, a transfer mechanism including support means for receiving unseamed tubular bodies, expanding means for expanding an unseamed tubular body seated on said support means to move unseamed edges thereof into spaced relation, and feed means for feeding an expanded unseamed tubular body towards said guide rail to a position adjacent said guide rail wherein unseamed edges of a tubular body will engage in the grooves of said guide rail.

2. The apparatus of claim 1 wherein there is a common support for said support means and said expanding means.

3. The apparatus of claim 2 wherein said expanding means includes a pair of opposed jaws disposed on opposite sides of said support means for cooperation therewith for receiving therebetween an unseamed tubular body and effecting initial positioning thereof relative to said support means.

4. The apparatus of claim 3 wherein mounting means mount said jaws for pivotal movement relative to said mounting means about spaced parallel axes also disposed parallel to said mounting means, actuator means connected to said jaws for effecting pivoting thereof, and holding means carried by said jaws for releasably holding adjacent portions of an unseamed tubular body in contact with said jaws for movement therewith.

5. The apparatus of claim 4 wherein said holding means are of a type operative only on an exterior surface of an unseamed tubular body.

6. The apparatus of claim 4 wherein said holding means are magnetic means.

7. The apparatus of claim 1 wherein the apparatus includes forming means for forming unseamed tubular bodies from flat blanks in alignment with said transfer means, and means are provided for moving each newly formed unseamed tubular body from said forming means to said transfer means.

8. The apparatus of claim 7 wherein said forming means includes aligning means for aligning a newly formed unseamed tubular body with said transfer means, said aligning means including a support rail about which an unseamed tubular body is formed and from which the same is suspended.

9. The apparatus of claim 1 wherein there is a seam forming mechanism aligned with said guide rail for forming a side seam in a tubular body, and means for delivering an unseamed tubular body from said guide rail to said seam forming mechanism.

10. The apparatus of claim 9 wherein said seam forming mechanism is a welding mechanism.

11. The apparatus of claim 1 wherein said feed means are connected to said support means and said expanding means for moving the same relative to said guide rail in the positioning of an unseamed tubular member relative to said guide rail.

12. A method of forming a tubular body having a longitudinal side seam, said method comprising the steps of providing a blank, shaping the blank into unseamed tubular form, expanding the unseamed tubular body to separate edges thereof which are to be joined in forming a side seam, positioning the unseamed tubular body on a guide rail by engagement of the edges of the unseamed tubular body with the guide rail, and using the guide rail as a guide moving the unseamed tubular body through a side seam forming mechanism to form a seamed tubular body.

* * * * *